United States Patent Office 3,748,300
Patented July 24, 1973

3,748,300
POLYHYDROXYSILICATE-POLYMER REACTION PRODUCT
Jean-Marc Lalancette, Sherbrooke, Quebec, Canada, assignor to Universite de Sherbrooke, Quebec, Canada
No Drawing. Filed July 2, 1971, Ser. No. 159,476
Int. Cl. C08g 51/04
U.S. Cl. 260—38
20 Claims

ABSTRACT OF THE DISCLOSURE

A new compound is provided which is the reaction product of a finely divided polyhydroxysilicate and a hydroxy-containing polymer such as phenol-formaldehyde, an epoxy resin or resorcinol-formaldehyde. The product can be molded and cured into any structural shape and provides highly interesting physical properties.

---

This invention relates to a new polymeric compound and to a shaped structure prepared therefrom.

PRIOR ART

Shaped structures formed from polymers or mixtures thereof present both advantages and disadvantages. Obviously due to relative high cost of polymers, attempts have been made to dilute the polymers with inert fillers to reduce the amount of polymer used in the shaped structure. Amongst the fillers heretofore used there may be mentioned powdered asbestos in short or long fibers, silicon carbide, carbon black, diatomaceous earth, slate dust, powdered rutile, powdered or flaked mica, powdered quartz, ground cork, powdered limestone, sand or the like. In most cases these fillers were mixed with polymers such as melamine resins and the use of the filler was mainly intended to reduce the amount of resin used and thus the filler acted as a diluent for the polymer system. In this type of system no reaction or chemical bond occurred between the filler and polymer.

In other cases, the polymer and filler are selected whereby the filler is bound to the polymer through a third component referred to as a coupling agent. The coupling agent selected is a compound containing two or more reactive groups, at least one of which is suitable for reaction with the polymer and at least one of which is suitable for reaction with a filler. In this type of structure a chemical bond occurs through the coupling agent between the filler and the polymer. The coupling agent is characterized by its functional groups wherein one group is capable of reacting with the monomer during polymerization and at least one group is capable of reaction with the inorganic filler. The filler selected for this type of structure is one having available hydroxyl groups on an inorganic surface. Such systems are disclosed in U.S. Pat. 3,442,851, May 6, 1969, R. J. McManimie, U.S. Pat. 3,575,785, Apr. 20, 1971, R. J. McManimie et al., and U.S. Pat. 3,156,666, Nov. 10, 1964, R. D. Pruett.

SUMMARY OF THE INVENTION

In accordance with the present invention, it has now been found that a reaction product can be obtained by heat-setting a finely divided polyhydroxy silicate and a hydroxy-containing polymer without the necessity of a coupling agent. The coupling between the selected filler and selected polymer presents a silanol bond of the

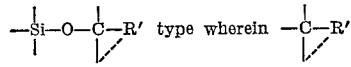

is the residue of hydroxy-containing polymer. Also contemplated within the scope of the present invention is a shaped structural material embodying a heat-cured reaction product of a finely divided polyhydroxy silicate and a hydroxy-containing polymer, wherein the coupling between the filler and the polymer presents a silanol bond of the type

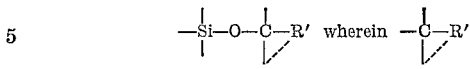

is the residue of a hydroxy-containing polymer.

The invention involves intimately mixing a finely divided polyhydroxy silicate and a hydroxy-containing polymer, heating the mixture and extruding or compressing the mixture while in the heated state and allowing the shaped or molded structure to set. Alternatively the finely divided polyhydroxy silicate can be added to a heated hydroxy-containing polymer an the intimate mixture compressed or extruded and allowed to set. The amount of finely divided polyhydroxy silicate is from 90 to 5% by weight while the hydroxy-containing polymer is from 5 to 95% by weight.

DESCRIPTION OF THE PREFERRED EMBODIMENTS

The silica used in accordance with the present invention must meet two qualifications. First, the silica must be finely divided. The particle size can extend from fibrous to as small as 325 mesh or even smaller. Secondly the silica used must contain hydroxyl groups and have what is known as a silanol surface which can be illustrated as follows:

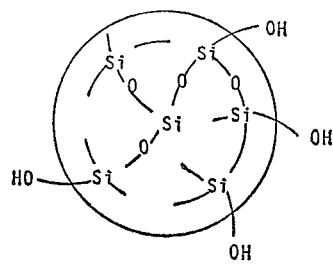

Such silica particles having a silanol surface, i.e. covered with a monolayer of hydroxyl groups may be referred to as hydrated silica or hydrated silicic acid or polysilicic acid or polyhydroxy silicates.

The reaction between the polyhydroxy silicate and hydroxy polymer is confirmed by raman spectroscopy and X-ray diffraction. The reaction between some of the hydroxyl groups of the polymer and the hydroxy silicate has not heretofore been reported in the chemical literature. The theory of the reaction may be postulated as follows: It has been shown by Bavery et al., Bull., Soc. Chim. p. 1301 (1964) that when a

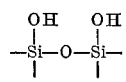

(I) structure bearing hydroxyl groups is heated above 100° C. there is a loss of water and a new

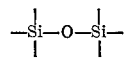

bond (II) is formed as follows:

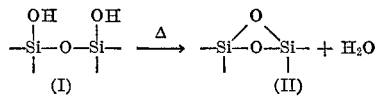

The reaction of II with the acidic hydroxyl groups of the hydroxy-containing polymer is then possible, such a reaction being induced by the polarity of the

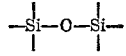

bond and the tension of the cyclic structure II. The reaction may be illustrated as follows:

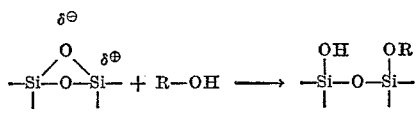

wherein R is the residue of the hydroxy polymer.

The

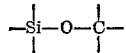

bond has already been reported in the literature in C. A. 52 16873 and 53 8809 and the compounds of the present invention present the same characteristic peak at 640 cm.$^{-1}$ for such a bond when analyzed by raman spectroscopy.

Further confirmation that a definite structural change occurs in the course of the reaction is observed through X-ray diffraction by comparing the spectra of a pure polymer, a pure hydroxy silicate and the reaction product thereof. From those measurements, it is possible to show that the polymer-silicate reaction product is not a mere random mixture of two components but that there are alternate layers of silicate and polymer in the final structure and that there was a shrinkage of the lattice of the order of 2%. The results of the X-ray diffraction are as follows:

| Pure silicate, d(obs.) A. | Lattice axes, h.k.l. | Polymer-silicate reaction product, d(obs.) A. |
| --- | --- | --- |
| 7.338 | 006 | 7.254 |
| 4.6769 | 020 | 4.728 |
| 3.658 | 0.0.12 | 3.639 |
| 2.501 | 206 | 2.489 |

It is observed that such an orderly structure accompanied by shrinkage of the lattice is a good indication that a chemical bonding is formed between the polymer and the hydroxy silicate.

As an example of polyhydroxy silicates suitable for use in accordance with the present invention there may be mentioned fine tailings or fibers from asbestos mining, clays, kaolinite, serpentine, pyrophyllite, talc, muscovite, paragonite, phlogopite, biotite or chlorite and similar inorganic hydroxy-containing silicate fillers.

The hydroxy-containing polymers suitable for combining with polyhydroxy silicates may be represented by the general formula:

wherein R is a phenol-formaldehyde residue, resorcinol-formaldehyde residue, an epoxy resin residue or a residue of a mixed phenol-resorcinol-formaldehyde resin.

The phenol-formaldehyde polymer may be partially represented by the formula:

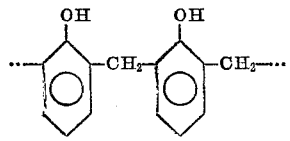

Phenol-formaldehyde resin or polymer is a well known resin which is derived from the condensation of phenol and formaldehyde in alkaline or acid media. This resin is available in liquid or granulated form and both forms are suitable for use in the present invention. As an example there may be mentioned a product sold by Union Carbide & Carbon Corp. under the trademark BRP-4425.

The resorcinol-formaldehyde resin may be partially represented by the formula:

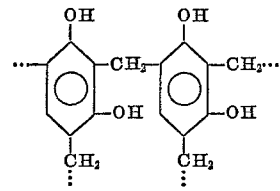

Resorcinol-formaldehyde resin is obtained by the condensation of resorcinol and formaldehyde in alkaline or acid media. As an example of a readily available resorcinol-formaldehyde there may be mentioned Plyophen® a product manufactured and sold by Reichold Chemical Inc.

The epoxy resins may be represented by the general formula:

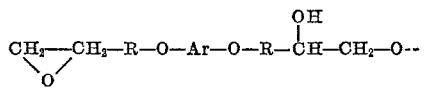

wherein R is an aliphatic divalent radical such as methylene and Ar is an aromatic divalent group such as phenyl. As an example of epoxy resins which may be used, there may be mentioned the EPON® resins manufactured and sold by Shell Chemical Corp. New York, N.Y.

The compositions of the present invention possess improved properties such as abrasion resistance, flexural strength, tensile strength, impact resistance, resistance to heat distortion and resistance to thermal expansion, resistance to outdoor weathering and electrical insulation capacity by comparison with compositions using conventional clay fillers and other compositions containing non-hydroxy-containing silicates. Further, they provide higher loading levels than can be achieved with glass fibers or plate-like mica particles, a most important economic consideration. Furthermore, the compositions of the present invention can be initially formed into a mixture or a slurry and then directly shaped and cured into a final polymerized form, thereby eliminating several processing steps usually required with glass fibers in reinforced compositions. In certain cases it may be desirable to include minor amounts of inorganic fillers where special design effects are desired. As an example there may be mentioned garnet which is a reddish brown, very hard inorganic material which contains surface hydroxyl groups. When coupled with the hydroxy-containing resins there will be obtained a structural material possessing stain resistance and impact strength.

It has also been found that the compositions of the present invention present non-linear electrical properties, being non-conductor up to a threshold in the range of several thousand volts per centimeter and then conductor at higher voltage independently of the thickness of the sample tested and therefore the products of the present invention offer an interest in the protection of electrical distribution lines.

The amount of filler used in the compositions of the present invention can vary over a range of from 90% to 5%. The amount of filler used will depend on the purpose for which the structural material is intended. For example, when it is desired to obtain resistance to mechanical compression the filler will be used preferably in an amount of about 70–90%.

As far as the particle size of the filler is concerned it can vary from finely divided to fibrous and therefore can have a mesh size as low as 325 mesh screen. As an example of a mixture of various mesh sizes there may be mentioned the following:

Mesh size: Percent
- 35 — 50
- 65 — 25
- 150 — 10
- 325 — 15

These figures regarding particle size distribution should not be construed as limiting, since both wider and narrower ranges of distribution will also be useful as both fibrous or finer compositions can be used. It should be appreciated that the filler performs a dual function in the finished composition. Depending on the material selected the filler serves as an inexpensive adduct to the polymer, thereby lowering the cost of the final product and secondly, and most important, the filler by being bound to the resin produces compositions with mechanical properties far superior to those of unreinforced polymers.

If it is desired to modify the physical properties of the shaped structures prepared in accordance with the present invention, other products may be incorporated in the product at the mixing stage. For example, if a lightweight and porous structural material is desired, there will be incorporated therein a small amount of sodium carbonate or sodium bicarbonate with a weak acid whereby the carbon dioxide formed in situ will cause the shaped material to be lightweight and porous thereby providing a shaped material possessing highly interesting insulating properties. In other cases, a small amount of finely divided iron oxide may be added to provide a shaped material having its colour altered to some extent but possessing interesting electrical or magnetic properties. When using asbestos tailings a small amount of a metal is always present therein so that addition of a metal is not necessary to obtain desired electrical properties. With other hydroxy silicates iron oxide would have to be added.

As an example of various particle sizes of a polyhydroxy silicate containing added iron oxide, there may be mentioned the following mixture:

Mesh: Percent
- 35 — 50
- 65 — 25
- 150 — 10
- 325 — 13
- Iron oxide — 2

The mixture of the heated polyhydroxy silicate and hydroxy-containing polymer is moulded in a steel mould at a temperature of about 175° C. and at a pressure of from 300 to 400 p.s.i. The pressure is applied for about 3 or 4 minutes and the shaped product is then cured at a temperature of from 100° to 125° C. In certain cases curing is not essential and the shaped product is allowed to stand in or out of the mold until it reaches room temperature.

The following examples more specifically illustrate some of the preferred composition, methods for preparation of structural materials in accordance with the present invention.

Example 1

A phenol-formaldehyde resin was prepared by adding 23 g. of paraformaldehyde to 47 ml. water and 5 ml. NaOH (40%) and the mixture stirred at room temperature for ten minutes. There was then added 50 g. of phenol (technical grade) and the reaction mixture refluxed for fifteen minutes.

The resin while still hot was poured on 708 g. of asbestos tailings (mesh 325) with strong mixing. A wet powder is obtained which is then placed in a steel mould heated to a temperature of 175° C. and maintained at a pressure of 350 p.s.i. for three minutes. The shaped material is then allowed to cure at a temperature of 100° C. for about 10 hours. The moulded material was rectangular in shape and samples of a thickness of from ¼" to 1½" were prepared. This product contains 10% resin and 90% filler.

Examples 2–9

The procedure of Example 1 was followed with varying proportions and mesh size of filler and resin:

| Ex. | Resin | Percent | Filler | Percent | Mesh size |
|---|---|---|---|---|---|
| 2 | Phenol-formaldehyde.[1] | 20 | Asbestos tailings. | 80 | 325 |
| 3 | do. | 16 | do. | 84 | 325 |
| 4 | do.[2] | 30 | do. | 70 | 325 |
| 5 | do.[3] | 20 | do. | 80 | 65 |
| 6 | do. | 30 | do. | 70 | 35 |
| 7 | do. | 20 | do. | 80 | 8–325 |
| 8 | do. | 20 | do.[4] | 80 | 325 |
| 9 | Epoxy | 30 | do. | 70 | 325 |

[1] Resin was concentrated by evaporating about 10% of water.
[2] Resin was concentrated by evaporating about 20–25% of water.
[3] Resin not concentrated.
[4] Tailings were stirred with strong magnet to remove magnetic constituents of tailings.

Example 10

To 100 g. of asbestos tailings (mesh 35) were mixed 200 g. of an epoxy resin (50:50 and hardener) and there was then added 5 g. of sodium bicarbonate and 10 g. of acetic acid. Mixing was facilitated by adding 10 ml. of acetone to the paste and the mixture heated and moulded in accordance with the procedure of Example 1 and the temperature of the mould was maintained at 150° C.–180° C. for two and one-half hours. There was obtained a porous and lightweight product made up of 30% filler and 70% resin.

Example 11

Using the procedure described in Example 1, 40 g. of phenol-formaldehyde resin were mixed with 160 g. of crude tailings and the mold was maintained at 100° C. for 14 hours. The asbestos tailings comprised 50% mesh 35, 25% mesh 65, 10% mesh 150, 13% mesh 325 and 2% iron oxide. The product obtained was made up of 80% of filler and 20% resin.

Example 12

The procedure of Example 1 was followed except that the asbestos tailings were replaced with 320 g. of clay dried for a few days at room temperature and 60 g. of phenol-formaldehyde resin. The product obtained contained 80% of clay and 20% of phenol-formaldehyde.

Example 13

The procedure of Example 12 was followed except that 60% of clay was used and 40% of resin.

Example 14

The procedure of Example 1 was followed except that four products were prepared each using 88% of serpentine mesh 200, 88% of silica mesh 200, 88% of kaolinite mesh 200 and 88% of calcium carbonate mesh 200 as filler and in all cases 12% of resin was used. The four products were submitted to the usual compression test and the following results were obtained:

| | P.s.i. |
|---|---|
| Serpentine | 7500 |
| Silica | 3200 |
| Kaolinite | 6800 |
| Calcium carbonate | 3100 |

It will be observed that the results were significantly lower in the case of the silica and calcium carbonate which are not hydroxy silicates.

Example 15

A resorcinol-formaldehyde resin was prepared by adding 23 g. of paraformaldehyde to 47 ml. water and 5 ml. NaOH (40%) and the mixture stirred at room temperature for ten minutes. There was then added 50 g. of resorcinol (technical grade) and the reaction mixture refluxed for fifteen minutes.

The resin while still hot was poured on 708 g. of asbestos tailings (mesh 325) with strong mixing. A wet powder is obtained which is then placed in a steel mould heated to a temperature of 175° C. and maintained at a pressure of 350 p.s.i. for three minutes. The shaped material is then allowed to cure at a temperature of 100° C. for about 10 hours. The moulded material was rectangular in shape and samples of a thickness of from ¼" to 1½" were prepared. This product contains 10% resin and 90% filler.

Example 16

A resorcinol-formaldehyde and phenol-formaldehyde resin was prepared by adding 23 g. of paraformaldehyde to 47 ml. water and 5 ml. NaOH (40%) and the mixture was stirred at room temperature for ten minutes. Then there was added 25 g. of phenol (technical grade) and 25 g. of resorcinol (technical grade) and the reaction mixture refluxed for fifteen minutes.

The resin while still hot was poured on 708 g. of asbestos tailings (mesh 325) with strong mixing. A wet powder is obtained which is then placed in a steel mould heated to a temperature of 175° C. and maintained at a pressure of 350 p.s.i. for three minutes. The shaped material is then allowed to cure at a temperature of 100° C. for about 10 hours. The moulded material was rectangular in shape and samples of a thickness of from ¼" to 1½" were prepared. This product contains 10% resin and 90% filler.

Example 17

Using the procedure of Example 1 and substituting therefor 709 g. of asbestos fibers 7T–F02 and 42 g. of phenol-formaldehyde resin there is obtained a product containing 15% resin and its bending modulus is reported in Table III.

Example 18

Using the procedure of Example 1 and substituting therefor 708 g. of asbestos fibers 7T–F02 and 47 g. of solid phenol-formaldehyde resin there is obtained a product containing 15% resin and its bending modulus is reported in Table III.

PHYSICAL PROPERTIES

Some of the products of the present invention were submitted to various tests and the results of these tests are reported in the following tables:

TABLE I.—DETERMINATION OF DENSITY

Procedure: AS.T.M. D792–60T(B).

| Example: | Specific gravity |
|---|---|
| 1 | 2.3 |
| 2 | 2.2 |
| 3 | 2.1 |
| 4 | 2.1 |
| 5 | 2.2 |
| 6 | 2.1 |
| 7 | 2.2 |
| 8 | 2.2 |
| 9 | 2.0 |
| 10 | 0.3 |
| 11 | 2.2 |
| 12 | 2.0 |
| 13 | 1.8 |

TABLE II.—RELATIVE THERMAL CONDUCTIVITY

Procedure: Some of the products of the present invention were compared for thermal conductivity with Transite® [1] for solid material and Styrofoam® [2] for porous material. The results where the products were more conductive are indicated by (+) and where the material was less conductive by (−). The products tested were cubes having sides or 2".

[1] Transite® is an asbestos cement mixture made by Johns-Manville Company.
[2] Styrofoam® is a porous polystyrene product manufactured and sold by the Dow Chemical Co.

Examples:

| | |
|---|---|
| 1 (+) | 9 (−) |
| 2 (+) | 11 (+) |
| 3 (+) | 12 (+) |
| 4 (+) | 13 (−) |
| 5 (+) | Porous sample |
| 6 (+) | from example: |
| 7 (+) | 10 (−) |
| 8 (+) | |

TABLE III.—BENDING MODULUS

Procedure: Products containing either 10 or 15% of resin and the remainder being asbestos tailings were tested in accordance with the procedure described in A.S.T.M. C459–63.

| Sample | Percent resin | T molding, degrees | T curing, degrees | Modulus (kg./cm.²) |
|---|---|---|---|---|
| 1 | 10 | 175 | 175 | 92.6 |
| 2 | 15 | 175 | 175 | 295.8 |
| 3 | 10 | 175 | 25 | 52.0 |
| 4 | 15 | 175 | 25 | 76.0 |
| 5 | 15 | 225 | 225 | 190.6 |
| 6 | 15 | 200 | 200 | 250.1 |
| 17 | 15 | 125 | 200 | 145.0 |
| 18 | 15 | 125 | 200 | 260.0 |

TABLE IV.—EXPOSURE TO HEAT

[Procedure: A.S.T.M. D794–62, 4 hours]

| Example | Temperature ° C. | Resistance upon impact after test | Percent weight loss | Appearance colour |
|---|---|---|---|---|
| 1 | 250 | Low | 8.0 | Violet red to brown grey. |
| 2 | 275 | Low | 3.4 | Do. |
| 3 | 250 | Low | 7.8 | Do. |
| 4 | 250 | Low | 7.5 | Do. |
| 5 | 275 | Low | 3.4 | Do. |
| 6 | 250 | Low | 7.8 | Do. |
| 7 | 275 | Low | 3.4 | Do. |
| 8 | 250 | Low | 8.0 | Do. |
| 11 | 275 | Low | 3.4 | Green grey to grey. |

TABLE V.—CYCLIC HEATING (+100° TO −15° C.)

[Procedure: A.S.T.M. D794–62T (1 hour at each temperature), 20 cycles]

| Example | Temperature range, degrees | Imapct resistance | Loss by percent weight | Appearance |
|---|---|---|---|---|
| 1 | From plus 100 to −15 | Excellent | 2.0 | Product unaffected. Colour: No change. |
| 2 | do | do | 0.9 | Do. |
| 3 | do | do | 1.8 | Do. |
| 4 | do | do | 1.6 | Do. |
| 5 | do | do | 0.9 | Do. |
| 6 | do | do | 1.8 | Do. |
| 7 | do | do | 0.9 | Do. |
| 8 | do | do | 2.0 | Do. |
| 11 | do | do | 0.9 | Do. |

TABLE VI.—ARTIFICIAL WEATHERING

[Procedure: A.S.T.M. D1501–57T]

| Example | Percent loss in dimensions | Impact resistance | Percent loss by weight | Appearance |
|---|---|---|---|---|
| 1 | <1.0 | Excellent | 2.0 | No change in colour. |
| 2 | <1.0 | do | 1.5 | Do. |
| 3 | <1.0 | do | 1.8 | Do. |
| 4 | <1.0 | do | 1.0 | Do. |
| 5 | <1.0 | do | 1.5 | Do. |
| 6 | <1.0 | do | 1.8 | Do. |
| 7 | <1.0 | do | 1.5 | Do. |
| 8 | <1.0 | do | 2.0 | Do. |
| 9 | <1.0 | do | 0.3 | Do. |
| 11 | <1.0 | do | 1.5 | Do. |
| 10 | <1.0 | | 0.3 | Slight change in foam hardness. No change of colour. |
| 12 | <1.0 | Medium | 2.5 | No change in colour. |
| 13 | <1.0 | Low | 0.9 | Do. |

TABLE VII.—FLAMMABILITY

[Procedure: A.S.T.M. D568-61]

| Example | Thickness of material, mm. | Application of the flame during 15 sec. | Burning rate, cm.²/min. | Appearance |
|---|---|---|---|---|
| 1 | ≃7 | Non-burning by this test | No ignition | The sample was not cracked and not ignited. |
| 2 | ≃7 | do | do | Do. |
| 3 | ≃7 | do | do | Do. |
| 4 | ≃7 | do | do | Do. |
| 5 | ≃7 | do | do | Do. |
| 6 | ≃7 | do | do | Do. |
| 7 | ≃7 | do | do | Do. |
| 8 | ≃7 | do | do | Do. |
| 9 | ≃7 | do | do | Do. |
| 11 | ≃7 | do | do | Do. |
| 10 | ≃20 | Burning | do | Slight ignition: |
| 12 | ≃30 | do | ≃0.1 | Do. |
| 13 | ≃30 | do | ≃0.4 | Do. |

TABLE VIII.—WATER ABSORPTION

[Procedure: A.S.T.M. D570-63]

| Ex. | 24 hrs immersion | Long-time immersion | 2 hrs. boiling water immersion | Immersion at 50° C. | Final appearance |
|---|---|---|---|---|---|
| 1 | 19.84 | 21.95 | 20.75 | 16.01 | (1) colour: no change; (2) impact resistance slightly change; (3) no cracking; (4) no warping. |
| 2 | 5.21 | 5.86 | 11.22 | 5.28 | Do. |
| 3 | 3.98 | 5.54 | 24.82 | 4.43 | Do. |
| 4 | 4.12 | 5.60 | 18.03 | 5.53 | Do. |
| 5 | 5.11 | 5.63 | 11.11 | 5.28 | Do. |
| 6 | 3.70 | 5.34 | 24.50 | 4.40 | Do. |
| 7 | 5.05 | 5.36 | 11.04 | 5.18 | Do. |
| 8 | 19.20 | 20.34 | 20.10 | 16.03 | Do. |
| 9 | 1.02 | 3.05 | 3.62 | 3.52 | Do. |
| 11 | 5.13 | 5.76 | 11.10 | 5.20 | Do. |
| 10 | 0.34 | 1.21 | 1.55 | 1.75 | (1) colour: no change; (2) resistance: slightly change. |
| 12 | 7.22 | 6.98 | 10.57 | 7.01 | (1) colour: no change; (2) change in impact resistance; (3) slightly cracked. |
| 13 | 2.30 | 4.82 | 3.78 | 2.78 | Do. |

TABLE IX.—RESISTANCE TO CHEMICAL REAGENTS

[Procedure: A.S.T.M. D543-60T contact of 7 days at 23° C. Examples Tested: 1 to 13]

| Reagents having no effect on those samples | Reagents attacking those samples |
|---|---|
| (1) Glacial acetic acid (conc.) | (1) Chromic acid (40%). |
| (2) Acetic acid (5%) | (2) Citric acid. |
| (3) Acetone | (3) Detergent solution. |
| (4) NH₄OH (conc.) | (4) H₂O₂ (28%). |
| (5) NH₄OH (10%) | (5) CH₃OH. |
| (6) Aniline | (6) HNO₃ (conc.). |
| (7) Benzene | (7) HNO₃ (40%). |
| (8) C Cl₄ | (8) HNO₃ (10%). |
| (9) Paraffin oil | (9) HF (40%). |
| (10) Diethyl ether | (10) Na₂CO₃ (40%). |
| (11) DMF | (11) NaOH (10% and 1%). |
| (12) H₂O (dist) | (12) H₂SO₄ (conc.). |
| (13) Ethyl acetate | (13) H₂SO₄ (30%). |
| (14) C₂H₅OH (95%) | (14) H₂SO₄ (3%). |
| (15) C₂H₅OH (5%) | |
| (16) Ethylene dichloride | |
| (17) Iso-octane | |
| (18) Kerosene | |
| (19) Oleic acid | |
| (20) Olive oil | |
| (21) Phenol solution (5%) | |
| (22) Na₂CO₃ (3%) | |
| (23) NaCl (2%) | |
| (24) NaOH (60%) | |
| (25) NaOCl (5%) | |

TABLE X.—ACETONE EXTRACTION

Procedure: A.S.T.M. DD494-46T.

This test was carried out to determine if any of the resin would be extractable with acetone but actually the acetone extractable material was mainly water.

Example: Acetone extractable matter, percent
1 ............................................ 0.6
2 ............................................ 2.1
3 ............................................ 1.5
4 ............................................ 1.8
5 ............................................ 2.1
6 ............................................ 1.5
7 ............................................ 2.1
8 ............................................ 0.6
9 ............................................ 2.1
12 ........................................... 3.0

TABLE XI.—RESISTANCE TO MECHANICAL COMPRESSION

Procedure: Maximum load on a machined faced cylinder 10 square inches in area, four inches high, loading rate of 6,000 pounds per minute per square inch.

Example: Maximum load (pounds/square inch)
1 ............................................ 7,500
3 ............................................ 8,500
6 ............................................ 11,000
7 ............................................ 8,750
9 ............................................ 4,000
10 ........................................... 175
11 ........................................... 7,750

TABLE XII.—ELECTRICAL INSULATION CAPACITY

Procedure: Samples of various thickness were placed between the terminals of a variable voltage transformer. The voltage required to conduction through the material was noted.

| Example | Thickness, inches | Voltage |
|---|---|---|
| 1 | ⅛ | 9,000 |
| 1 | ¼ | 15,500 |
| 1 | ½ | 18,500 |
| 1 | ¾ | 18,500 |
| 1 | 1½ | 18,500 |
| 8 | ¼ | 9,000 |
| 8 | ½ | 16,000 |
| 8 | 1 | 23,000 |
| 8 | 1½ | 26,000 |

What is claimed is:

1. As a new compound, the reaction product of a finely divided polyhydroxy silicate having a particle size of at least 325 mesh and a hydroxy-containing polymer selected from the group consisting of phenol-formaldehyde polymers resorcinol-formaldehyde polymers, phenol-resorcinol-formaldehyde polymers and epoxy resins, the new product presenting a characteristic silanol bond of the

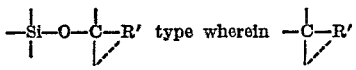

is the residue of said hydroxy-containing polymer, the amount of polyhydroxy silicate being from 90 to 5% by weight and the amount of polymer being from 10 to 95% by weight.

2. The compound of claim 1, wherein the hydroxy-containing polymer is phenol-formaldehyde.

3. The compound of claim 1, wherein the hydroxy-containing polymer is resorcinol-formaldehyde.

4. The compound of claim 1, wherein the hydroxy-containing polymer is an epoxy resin.

5. The compound of claim 1, wherein the hydroxy-containing polymer is a mixture of phenol-formaldehyde and resorcinol-formaldehyde.

6. A shaped structure formed from the reaction of from 90 to 5% by weight of a finely divided polyhydroxy silicate filler having a particle size of at least 325 mesh with from 10 to 95% by weight of a hydroxy-containing polymer selected from the group consisting of phenol-formaldehyde polymers, resorcinol-formaldehyde polymers, phenol - resorcinol - formaldehyde polymers and epoxy resins, the polyhydroxy silicate and hydroxy-containing polymer presenting a characteristic silanol bond of the

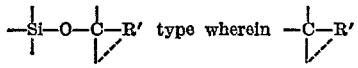

is the residue of the hydroxy-containing polymer.

7. The structure of claim 6, wherein the polymer is phenol-formaldehyde.

8. The structure of claim 6, wherein the polymer is resorcinol-formaldehyde.

9. The structure of claim 6, wherein the polymer is an epoxy resin.

10. The structure of claim 6, wherein the polymer is a mixture of phenol-formaldehyde and resorcinol-formaldehyde.

11. A process comprising mixing a hydroxy-containing polymer selected from the group consisting of phenol-formaldehyde polymers, resorcinol-formaldehyde polymers, phenol - resorcinol - formaldehyde polymers and epoxy resins, with a finely divided polyhydroxy silicate having a size between 8 mesh and 325 mesh and characterized by a surface layer of hydroxyl groups, heating the mixture while maintaining the reactants in intimate contact to a temperature at least equal to the softening temperature of the polymer, forming a structure of the reaction mixture and cooling the formed structure.

12. A process as in claim 11, wherein the polymer is phenol-formaldehyde.

13. A process as in claim 11, wherein the polymer is resorcinol-formaldehyde.

14. A process as in claim 11, wherein the polymer is an epoxy resin.

15. A process as in claim 11, wherein the polymer is a mixture of phenol-formaldehyde and resorcinol-formaldehyde.

16. A process which comprises mixing a hydroxy-containing polymer selected from the group consisting of phenol-formaldehyde polymers, resorcinol-formaldehyde polymers, phenol-resorcinol-formaldehyde polymers and epoxy resins, with a finely divided, polyhydroxy silicate presenting a structure of the formula:

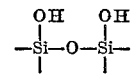

heating the reactants to a temperature of above 100° C. whereby loss of water rearranges the silicate to the following structure:

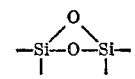

and whereby a reaction occurs between the last-mentioned structure and the acidic hydroxyl groups of the hydroxy-containing polymer thereby to form a silanol bond of the structure:

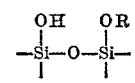

wherein R is the residue of the hydroxy-containing polymer, forming a structure of the reaction mixture and cooling the formed structure.

17. A compound according to claim 1 containing 90% by weight of polyhydroxy silicate and 10% by weight of polymer.

18. A compound according to claim 1 containing 90 to 80% by weight of polyhydroxy silicate and 10 to 20% by weight of polymer.

19. A compound according to claim 1 containing 85% by weight of polyhydroxy silicate and 15% by weight of polymer.

20. A compound according to claim 1 containing 80% by weight of polyhydroxy silicate and 20% by weight of polymer.

References Cited
UNITED STATES PATENTS

| | | | |
|---|---|---|---|
| 3,061,577 | 10/1962 | Pruett | 260—41 A |
| 3,470,128 | 9/1969 | Ernst et al. | 260—37 Ep |
| 2,999,833 | 9/1961 | Bleuenstein | 260—38 |

LEWIS T. JACOBS, Primary Examiner

U.S. Cl. X.R.

260—37 EP